(12) United States Patent
Koo et al.

(10) Patent No.: US 9,021,824 B2
(45) Date of Patent: May 5, 2015

(54) APPARATUS FOR SUPPLYING AIR OF FUEL CELL VEHICLE

(71) Applicant: Hyundai Motor Company, Seoul (KR)

(72) Inventors: Jin Woo Koo, Seoul (KR); Hyun Yoo Kim, Seoul (KR); Hyuck Roul Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 13/829,816

(22) Filed: Mar. 14, 2013

(65) Prior Publication Data

US 2014/0157819 A1 Jun. 12, 2014

(30) Foreign Application Priority Data

Dec. 7, 2012 (KR) .................. 10-2012-0141535

(51) Int. Cl.
*B60H 1/32* (2006.01)
*H01M 8/04* (2006.01)
*B60L 1/00* (2006.01)
*B60L 11/18* (2006.01)

(52) U.S. Cl.
CPC .......... *H01M 8/04059* (2013.01); *B60L 1/003* (2013.01); *B60L 11/1892* (2013.01); *B60L 2200/10* (2013.01); *B60L 2200/18* (2013.01); *B60L 2200/32* (2013.01); *B60L 2200/36* (2013.01)

(58) Field of Classification Search
CPC .......... H01M 8/04059; B60H 1/00278; B60L 11/1892; B60L 1/003; B60L 2200/18; B60L 2200/32; B60L 2200/36; B60L 2200/10

USPC .......... 62/64, 375, 244, 259.4, 150, 289, 498; 429/413, 414, 434, 450

See application file for complete search history.

(56) References Cited

U.S. PATENT DOCUMENTS

| 3,498,072 | A  | * | 3/1970 | Stiefel ............................. 62/118 |
| 5,432,020 | A  |   | 7/1995 | Fleck |
| 6,432,568 | B1 | * | 8/2002 | Salvador et al. .............. 429/423 |
| 7,691,501 | B2 | * | 4/2010 | Park et al. ......................... 429/9 |
| 2001/0014415 | A1 | * | 8/2001 | Iio et al. ........................... 429/22 |
| 2002/0039672 | A1 | * | 4/2002 | Aramaki .......................... 429/22 |
| 2002/0094463 | A1 | * | 7/2002 | Luken et al. .................... 429/22 |
| 2002/0146606 | A1 | * | 10/2002 | Kobayashi et al. ............. 429/24 |

(Continued)

FOREIGN PATENT DOCUMENTS

| JP | 2004-155295 A | 6/2004 |
| KR | 10-2009-0091388 A | 8/2009 |

(Continued)

*Primary Examiner* — Mohammad M Ali
(74) *Attorney, Agent, or Firm* — Mintz Levin Cohn Ferris Glovsky and Popeo, P.C.; Peter F. Corless

(57) ABSTRACT

An apparatus that efficiently supplies air to a fuel cell within a vehicle. In particular, a compressor compresses air and supplies a first portion of the compressed air to an evaporator and a second portion to a heat exchanger. A drain valve also discharges condensate water from a fuel cell to the evaporator so that the evaporator receives some of both the compressed air and the condensate water and supplies air humidified by evaporation of the condensate water directly to the fuel cell. A heat exchanger also receives some of the compressed air, transfers heat from the received compressed air to the evaporator, and discharges cooled air to a humidifier. The humidifier receives and humidifies the cooled air and supplies the humidified air to the fuel cell.

5 Claims, 1 Drawing Sheet

(56) References Cited

U.S. PATENT DOCUMENTS

| | | | |
|---|---|---|---|
| 2002/0175010 A1* | 11/2002 | Kobayashi et al. | 180/65.3 |
| 2003/0008185 A1* | 1/2003 | Sugino et al. | 429/13 |
| 2003/0022050 A1* | 1/2003 | Barton et al. | 429/34 |
| 2003/0031902 A1 | 2/2003 | Balasubramanian et al. | |
| 2005/0199192 A1* | 9/2005 | Goebel et al. | 123/41.01 |
| 2005/0202293 A1* | 9/2005 | Kagami et al. | 429/24 |
| 2006/0210849 A1* | 9/2006 | Bono | 429/22 |
| 2007/0026281 A1* | 2/2007 | Ueda et al. | 429/26 |
| 2007/0122669 A1* | 5/2007 | Kusano et al. | 429/26 |
| 2007/0141418 A1* | 6/2007 | Ota et al. | 429/24 |
| 2007/0218328 A1* | 9/2007 | Osada | 429/22 |
| 2010/0009226 A1 | 1/2010 | Konrad et al. | |
| 2010/0062319 A1* | 3/2010 | Katano et al. | 429/34 |
| 2010/0278665 A1* | 11/2010 | Katano et al. | 417/410.1 |
| 2011/0070508 A1* | 3/2011 | Tanaka et al. | 429/410 |

FOREIGN PATENT DOCUMENTS

| | | |
|---|---|---|
| KR | 10-2011-0050005 A | 5/2011 |
| KR | 10-2012-0111169 | 10/2012 |

\* cited by examiner

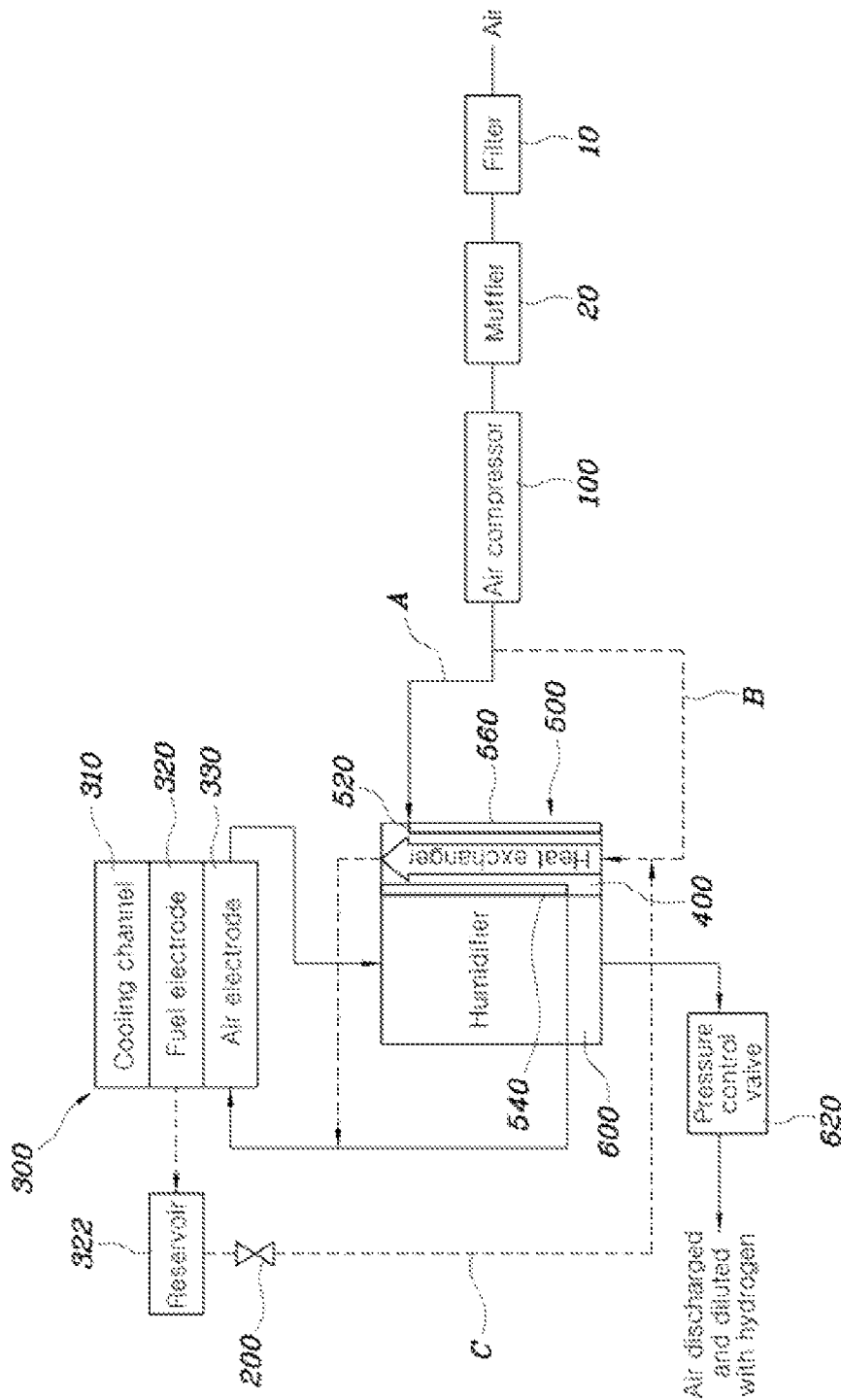

APPARATUS FOR SUPPLYING AIR OF FUEL CELL VEHICLE

CROSS-REFERENCE TO RELATED APPLICATION

This application claims under 35 U.S.C. §119(a) the benefit of Korean Patent Application No. 10-2012-0141535 filed Dec. 7, 2012, the entire contents of which are incorporated herein by reference.

BACKGROUND (a) Technical Field

The present invention relates to an apparatus for supplying air of a fuel cell vehicle to effectively cool oversupplied air in a fuel cell vehicle.

(b) Background Art

Fuel cell vehicles are equipped with a system that oversupplies air through a compressor when a rapid output is requested. To control the supply of air to the air compressor, an air compression control valve is typically disposed at the rear end of a humidifier in a fuel cell system.

In particular, when the air pressure increases, a partial pressure of the vapor in the air supplied to a stack increases and relative humidity increases as a result. Furthermore, the temperature of the air at the outlet of the compressor is increased by a high compression ratio of the air compressor under a high-output operation condition. Since the high-temperature air decreases the performance of the humidifier, it is necessary to reduce the temperature of the supplied air. To do this, an intercooler is often used for this purpose.

However, the intercooler occupies a large amount of space and a cooling water channel to cool the water is additionally required. Also, the cooling load of a radiator increases because cooling water is generally used. Also, there is a significant load on the water pump, the packaging is difficult to use, and a bypass line required for the system to work is often complicated.

In relation to the above problems, an air supply apparatus for a fuel cell that supplies air to a stack of a fuel cell, and includes: a compressor that generates oversupplied air by compressing external air; a first cooling unit disposed at the downstream side from the compressor, including a vortex tube, and separating the oversupplied air into low-temperature oversupplied air and high-temperature oversupplied air by using energy separation; and a second cooling unit disposed at the downstream from the first cooling unit and cooling the low-temperature oversupplied air supplied from the first cooling unit by using cooling water.

However, in the above solution it is difficult to effectively cool the air. The above system is also more complicated and heavy that is desirable because a separate intercooler is required in order to the system to work properly. Therefore, it was necessary to develop an apparatus for supplying air of a fuel cell vehicle that can effectively cool oversupplied air and supply humidity via a relatively simple system.

The description provided above as a related art of the present invention is just for helping understanding the background of the present invention and should not be construed as being included in the related art known by those skilled in the art.

SUMMARY OF THE DISCLOSURE

The present invention has been made in an effort to solve the above problems with the related art and an object of the present invention is to provide an apparatus for supplying air of a fuel cell vehicle that can effectively cool oversupplied air and supply humidity via a relatively simple system.

In order to achieve the objects of the present invention, an apparatus for supplying air of a fuel cell vehicle includes: a compressor that compresses introduced into the compressor; a drain valve that discharges condensate water from a fuel cell; an evaporator that receives a portion of the compressed air and the condensate water and supplies air humidified by evaporation of the condensate water to the fuel cell; a heat exchanger that receives another portion of the compressed air, transfers heat from the received air to the evaporator, and discharges cooled air; and a humidifier that receives and humidifies the cooled air and supplies the humidified air to the fuel cell.

In some exemplary embodiments of the present invention, the compressor may be connected with the heat exchanger via a main line and connected with the evaporator via a sub-line diverging from the main line. Furthermore, the heat exchanger may include: a receiving part that introduces compressed air; a discharging part that discharges cooled air; and a circulating part that circulates air, and the evaporator may be disposed in the circulating part to evaporate condensate water by receiving heat.

Additionally, the drain valve may be disposed in a reservoir storing condensate water in connection with a fuel electrode of the fuel cell. Additionally, the humidifier may receive some of condensate water from the drain valve.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 is a diagram illustrating the configuration of an apparatus for supplying air of a fuel cell vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An apparatus for supplying air of a fuel cell vehicle according to an exemplary embodiment of the present invention is described hereafter with reference to the accompanying drawings.

FIG. 1 shows the configuration of an apparatus for supplying air of a fuel cell vehicle according to an exemplary embodiment of the present invention and the apparatus includes: a compressor 100 that compresses air that is received therein from the atmosphere, and a drain valve 200 that is configured in the apparatus to discharge condensate water from a fuel cell 300. An evaporator 400 receives a portion of the compressed air and a portion of the condensate water and supplies air humidified by evaporation of the condensate water to the fuel cell 300; a heat exchanger 500 receives the other portion of the compressed air (i.e., the rest of the air not received by the evaporator), transfers heat from the received compressed air to the evaporator 400, and discharges cooled air therefrom to the fuel cell 300. A humidifier 600 receives air from the fuel cell 300 and humidifies the cooled air and supplies the humidified air to the fuel cell 300.

The apparatus for supplying air of a fuel cell vehicle of the present invention for the most part includes the compressor 100 selectively operating when air needs to be oversupplied to the system. The compressor 100 compresses and discharges air with the assistance of a filter 10 and a muffler 20, if necessary.

When the air passing through the compressor 100, which is high-temperature and high-pressure air, is directly sent to the humidifier, the efficiency of the humidifier may be reduced and the durability of the humidifier may be degraded. Therefore, in order to cool the air in the related art, it is necessary to include an intercooler at the rear end of the compressor and provide a separate cooling line for the operation of the intercooler, which is complicated and a costly.

In the present invention, some the high-temperature and high-pressure air discharged from the compressor 100 is sent to the humidifier 600 and some of the air is bypassed. Further, the air sent to the humidifier 600 passes through the heat exchanger 500 that receives some of the compressed air, transfers heat from the air to the evaporator 400, and discharges the cooled air, before being supplied to the humidifier 600. The heat exchanger 500 receives the high-temperature and high-pressure compressed air and transfers heat by circulating the air. Further, the evaporator 400 that receives some of the compressed air and some the condensate water and supplies the air humidified by the evaporation of the condensate water to the fuel cell 300 is disposed within the heat exchanger 500 as well.

The drain valve 200 that discharges the condensate water produced by a reaction is disposed in the fuel cell. Therefore, the condensate water discharged from the drain valve 200 and some of the high-temperature and high-pressure air bypassed and supplied from the compressor 100 may be sent to the evaporator 400 and the evaporator 400 may produce humid air by transferring heat within the heat exchanger 500 and evaporating the condensate water, so that air can be directly supplied to the fuel cell without passing through the humidifier.

Further, the cooled air being emitted from the heat exchanger is introduced into the humidifier 600, so that cooled air is sufficiently received and humidified without the assistance of an intercooler, so that humidification efficiency increases and durability of the humidifier is maintained. Further, the humidifier may be equipped with a pressure control valve 620 which is configured to release pressure in the humidifier when the pressure exceeds a given value.

In detail, the compressor 100 may be connected to the heat exchanger 500 via main line A and may be connected with the evaporator 400 via a sub-line B diverging from the main line A. In particular, a first portion of the high-temperature and high-pressure compressed air partially flows through the main line A and a second portion flows through the sub-line B. The heat in the air in the main line is transferred within the heat exchanger, and is then received by the humidifier 600, and then supplied to the fuel cell 300 after being humidified.

Further, the air in the sub-line B is humidified by the evaporation of the condensate water after being mixed with the condensate water, and then directly supplied to the fuel cell 300 without passing through the humidifier 600. As a result, the fuel cell 300 always received humidified air, the air of the compressor 100 is divided into three sections and heat is exchanged, and there is a low loss rate during humidification because the air humidified through the humidifier 400 is directly introduced. Therefore, according to the present invention, the system is lighter than the system with an intercooler of the related art, the humidification efficiency is increased. Air is also quickly supplied to the fuel cell, so that the entire output efficiency of the system is increased.

Meanwhile, the heat exchanger 500 is composed of a receiving part 520 that introduces compressed air, a discharging part 540 that discharges cooled air, and a circulating part 560 that circulates air. The evaporator 400 may be disposed in the circulating part 560 so that it can evaporate condensate water upon receiving heat. That is, the heat exchanger 500 receives high-temperature air from the main line A, circulates the air to the circulating part 560, and discharges cooled air to the humidifier through the discharging part 540.

Further, the evaporator 400, disposed in the circulating part 560, receives heat to condensate water/air mixture, the condensate water is evaporated and the air is humidified by the heat. The humidified air is then directly supplied to an air electrode 330. That is, the evaporator 400 of the present invention produces humidified air by evaporating the condensate water/air mixture, and thus any device having this function may be considered as the evaporator 400. Therefore, the evaporator 400 may be connected with the heat exchanger 500 to be able to exchange heat through the heat exchanger 500, and preferably, the heat exchanger 500 and the evaporator 400 may be integrally formed by integrating the function of the evaporator 400 in the heat exchanger 500, that is, with the circulating part 560.

Further, the drain valve 200 may be disposed in a reservoir that stores condensate water in connection with the fuel electrode 320 of the fuel cell 300 and the humidifier 600 may introduce some of the condensate water from the drain valve 200. Alternatively, the humidifier 600 may receive condensate water from a hydrogen purge valve, which may be disposed at the outlet of the fuel electrode, or may introduce condensate water from the air electrode of the fuel cell. That is, the present invention may be applied to all of fuel cell systems with various layouts. Further, a control valve that can control the flow rate through the sub-line A and the main line B may be further included.

The operation of the present invention is summarized again below. The pressure of air in a fuel cell variable pressure system increases to a very high pressure and the increased air temperature needs to be cooled in order to improve the performance of the humidifier. For more effective results, the high-temperature air is cooled via the heat exchanger. In particular, the larger the output, the larger the effect, and it is preferable to fit the present invention to conditions with high output such that conditions for heat exchanging and humidifying are suitable, when designing the system. It is possible to absorb heat generated from the air compressor with an evaporator such that the condensate water at the fuel electrode can be sufficiently evaporated, in a high-output section.

Some of the high-temperature air passing through the air compressor is supplied into the evaporator through the sub-line and meets with the condensate water generated in the fuel cell system. Then some of air and condensate water is evaporated by the heat from the high-temperature compressed air passing the outside of the evaporator (e.g., by using an evaporation cooling effected) and the humidified air passing through the evaporator is supplied to the stack air electrode. The heat for evaporating the condensate water in the evaporator is received from the high-temperature compressed air (i.e., heat exchanger) flowing through the evaporator, and accordingly, the high-temperature compressed air is cooled through the heat exchanger.

As such, under the above configuration, a system can evaporate the condensate water in the fuel cell system in the evaporator, using the high-temperature compressed air passing through the air compressor, and can both cool the supplied air and humidify the air supplied to the stack, using evaporation latent heat of water.

According to the apparatus for supplying air of a fuel cell vehicle with the structure described above, the efficiency and performance of a humidifier are improved by reducing the temperature of the supplied air via the heat exchanger. Further, since the humidified air (some of air+vapor) passing through the heat exchanger through the sub-line is directly supplied to the stack air electrode, sufficient air can be supplied to the stack. Further, particularly, the maximum output of the system is improved and the balance of the condensate water is improved by cooling the air under the condition with the maximum load.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for supplying air of a fuel cell vehicle, comprising:
   a compressor compressing air received therein;
   a drain valve that discharges condensate water from a fuel cell;
   an evaporator that receives a first portion of the compressed air and the condensate water and supplies air humidified by evaporation of the condensate water to the fuel cell;
   a heat exchanger that receives a second portion of the compressed air, transfers heat from the received air to the evaporator air and condensate water mixture, and discharging cooled air to the humidifier; and
   a humidifier that receives and humidifies the cooled air from the heat exchanger and supplies the humidified cooled air to the fuel cell.

2. The apparatus of claim 1, wherein the compressor is connected with the heat exchanger via a main line and connected with the evaporator via a sub-line diverging from the main line.

3. The apparatus of claim 1, wherein the heat exchanger includes:
   an receiving part that receives compressed air; a discharging part that discharges cooled air from the heat exchanger; and a circulating part that circulates air within the heat exchanger, and
   the evaporator is disposed in the circulating part to evaporate condensate water by receiving heat from the second portion of air.

4. The apparatus of claim 1, wherein the drain valve is disposed in a reservoir to store condensate water in connection with a fuel electrode of the fuel cell.

5. The apparatus of claim 1, wherein the humidifier receives a portion of condensate water from the drain valve.

* * * * *